Aug. 5, 1947.   I. J. WALKER ET AL   2,425,272
FISHING LURE
Filed Sept. 24, 1945
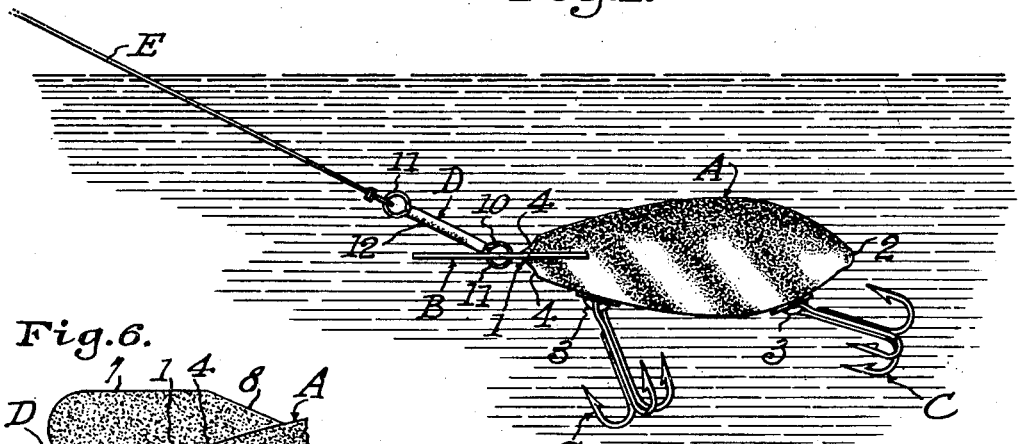
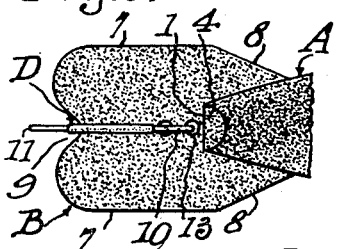
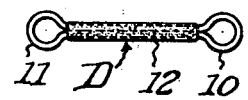
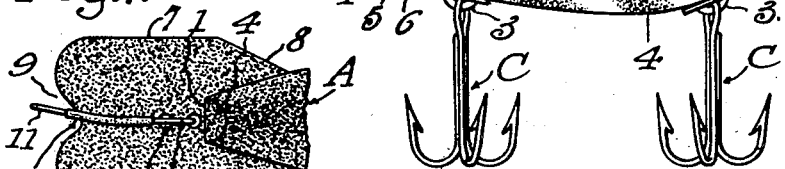
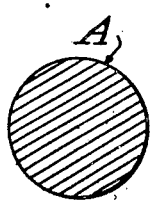
INVENTORS
ISAAC J. WALKER
RALPH E. WHAM
CLARENCE S. TURBEVILLE
BY Baldwin + Wight
ATTORNEYS Patented Aug. 5, 1947

2,425,272

UNITED STATES PATENT OFFICE 2,425,272

FISHING LURE

Isaac J. Walker, Ralph E. Wham, and Clarence S. Turbeville, Gainesville, Tex.

Application September 24, 1945, Serial No. 618,258

6 Claims. (Cl. 43—46)

This invention relates to artificial fishing lures and more particularly to lures of the class frequently referred to as "plugs." Lures of this general class are well known. Some previously known plug type lures include, in general, a buoyant plug body, a hook or hooks attached to the bottom of the plug body, and a bill or fin at the leading end of the body. Most of the bills of the prior art plug lines which have come to our attention have been bent, curved, or disposed at angles to the horizontal, and the shapes and weight distributions of the plugs have been such as to result in undesirable characteristics in the action of the lures when drawn through the water. Among such disadvantages is the tendency of the prior art plug lures alternately to dive and rise when being retrieved at a constant speed. This alternate diving and rising is dissimilar to the evasive action of a frightened minnow or other small fish, and furthermore it makes it difficult if not impossible for the fisherman to control the depth of the retrieving path or course. This, in turn, makes it difficult for the fisherman to cause the lure to rise over sunken logs or other submerged obstructions.

An object of the present invention is to provide an artificial fishing lure of the "plug class in which the component parts are so shaped, balanced, proportioned, and relatively associated or combined as to avoid the disadvantages of prior art lures. More specifically, an object of the invention is to provide a lure of the class referred to which, although statically buoyant, is adapted to be retrieved below the water surface at a substantially constant level for a particular rate of retrieving, the retrieving depth being variable, however, with variation in the rate of retrieving. Thus, the fisherman can cause the lure to dive, that is, run with its longitudinal axis at an inclination to the horizontal, by retrieving more rapidly, can cause the lure to rise by retrieving more slowly, and can cause the lure to run submerged at a constant level by retrieving at a constant rate.

Another object of the invention is to provide a lure of the character described which will wiggle or dodge back and forth horizontally during retrieving so as to simulate closely the evasive action of a live minnow or small fish attempting to escape from a larger fish, the fisherman's quarry.

A further object is to provide a plug lure equipped with a pulling link adapted to be adjusted, as by bending, to a set position so as to give the lure a tendency to run to one side of the direction of pull of the line.

Other objects will become apparent from a reading of the following description, the appended claims, and the accompanying drawing, in which:

Figure 1 is an elevation of a plug lure embodying the invention shown as being retrieved through the water by an attached line;

Figure 2 is an elevation of the lure shown in static condition and drawn on an enlarged scale;

Figure 3 is a top plan view of the lure with the hooks and pulling link omitted;

Figure 4 is a section on the line 4—4 of Figures 2 and 3;

Figure 5 is a detail elevation of the pulling link, drawn on an enlarged scale;

Figure 6 is a fragmentary top plan view showing the pulling link arranged to cause the lure to follow generally a path extending equidistantly on opposite sides of the direction of retrieving pull of the fishing line; and Figure 7 is a view similar to Figure 2 but showing the pulling link bent or deformed to cause the lure to tend to travel to one side of the direction of retrieving pull of the line.

The plug lure shown as an illustrative embodiment of the invention includes a plug proper or body A, a bill or plate B, and two treble hooks C depending from the bottom side of the body A, one adjacent the front or leading end 1 of the body A and the other adjacent its rear end 2. A pulling link D is connected to the bill B and is adapted to be connected in turn to a line E.

The plug body A is shown as being ornamented or marked on its surface to cause it more nearly to resemble a live bait fish, but the coloring or other surface treatment per se is not claimed as our invention. The body A preferably is made of selected wood, such as white cedar. The buoyancy of the body, taken in connection with the shape and balancing of the plug parts, and the manner of connecting the pulling member D to the bill B, is an important feature of the invention. The hooks C are shown as being attached to the body A by conventional recessed eyelets 3. The positioning of the hooks on the body A as shown is a factor affecting the balancing of the plug but the specific attaching device 3 may be replaced by any suitable or equivalent devices.

In one preferred embodiment of the invention, the maximum cross section of the plug body A is located approximately two-thirds of the distance from its front end 1 to its rear end 2, as indicated by the section lines 4—4 in Figures 2 and 3. The plug body shown is generally circular in cross section substantially throughout its length and tapers from its portion of maximum cross section towards its ends 1 and 2. Preferably the tapering surface is convex in longitudinal section as shown. The extreme leading of front end 1 is shown as being formed as two slightly concave surfaces 4—4.

The bill B, preferably of metal, is mounted to extend forwardly from the front end 1 of the plug body A. The body A may be slotted at 5 to receive the bill. A countersunk screw, pin, or other fastening device 6 may be provided for securing the bill B in the slot.

The bill B is shown as being flat and lies in a horizontal plane containing the longitudinal center line or axis of the plug. The bill is symmetrical in the horizontal plane and has substantially straight parallel side portions 7—7 and inclined portions 8—8 which converge and meet the surface of the body A about one-fifth of the distance from the body end 1 to the end 2. The leading edge of the bill B is formed with an indentation or notch 9 which is symmetrical with respect to the axis of the body A and bill B.

The bill is substantially wider than the body so as to open up the water and cut a path on both sides of as well as in front of the body, thus providing for retrieving at a constant level for a particular rate of wind-in.

Preferably, the bill B is wider than the front hook C so as to overlie the latter completely and thus minimize the danger of the hook's becoming fouled or lodging in an obstruction.

The pull link D is formed in any suitable manner, but it should be bendable or deformable and capable of remaining in a set or adjusted degree of bend or deformation. In the form shown, it is formed of wire bent to form loops or eyes 10 and 11 connected by a shank 12. The shank 12 is covered with solder and is bendable by finger pressure. The loop 10 passes through two openings 13 in the bill B on the longitudinal axis of the plug and bill and the loop 11 is adapted to be attached to the line E. As shown in the drawing, the openings 13 are spaced from each other along the longitudinal axis of the plug body A, and are disposed a substantial distance to the rear of the front or leading end of the bill B, preferably being closer to the plug body than to the leading edge of the bill. The openings 13 are so located that the area of the bill B exposed to the water in front of the intersection of the line of pull with the bill is greater than the area of the bill exposed to the water to the rear of the intersection of the line of pull with the bill. In the form shown the openings 13 are located rearwardly of a point centrally located with respect to the closest forward edge portion of the bill B and the closest forward edge of the plug A.

If the shank 12 is straight as shown in Figure 6 the plug will follow a path of retrieve substantially centralized with respect to the direction of extent of the line E. However, if the shank is bent to the position shown in Figure 7 the plug will tend to run off to the fisherman's left when being retrieved. If the shank is bent oppositely to the bend shown in Figure 7 the plug will tend to veer off to the fisherman's right.

Fishing lures embodying our invention have numerous advantages as compared to prior art lures of which we have knowledge. The depth of the retrieve can be varied by varying the rate of retrieving but nevertheless the lure can be made to stay at a constant underwater level when desired. Thus, when the lure approaches an undesired water obstruction it can be made to rise over it by momentarily reducing the rate of retrieving. Although capable of being retrieved at a constant level the lure executes a succession of fast, short, dodging wiggles in a horizontal plane closely resembling the evasive action of a frightened fish. By bending the puller link D the general path of the retrieve may be shifted to one side or the other.

The plug lure shown by way of example embodies the invention in a preferred form, but it will be understood that some changes may be made without departing from the invention as defined in the claims.

We claim:

1. In an artificial fishing lure, the combination of an elongated buoyant plug tapered towards its opposite ends; hook means attached to one side of said plug to depend therefrom so that said side constitutes the bottom of the plug; a flat bill extending from an end of the plug in a horizontal plane containing the longitudinal center line of the plug; two spaced openings in said bill, both on the longitudinal center line of said bill and both being located a substantial distance to the rear of the leading end of the bill, the area of said bill exposed to the water in front of the intersection of the line of pull with the bill being greater than the area of the bill exposed to the water to the rear thereof; and a puller link having an eye loop passing through said openings and encompassing the bill material between said openings.

2. In an artificial fishing lure, the combination of an elongated buoyant plug tapered towards its opposite ends; hook means attached to one side of said plug to depend therefrom so that said side constitutes the bottom of the plug; a flat bill extending from an end of the plug in a horizontal plane containing the longitudinal center line of the plug; two spaced openings in said bill, both on the longitudinal center line of said bill and both being located rearwardly of a point centrally located with respect to the closest forward edge portion of the bill and the closest forward edge of the plug; and a puller link having an eye loop passing through said openings and encompassing the bill material between said openings, said puller link being bendable transversely of a vertical plane containing the center line of said plug and bill and having such characteristics that when so bent it will remain in the bent or deformed condition while in use to give the lure a tendency to run to one side.

3. In an artificial fishing lure, the combination of an elongated buoyant plug tapered towards its opposite ends; hook means attached to said plug; a flat bill extending from an end of the plug in a horizontal plane containing the longitudinal center line of the plug; two spaced openings in said bill, both on the longitudinal center line of said bill, and both being located closer to the plug than to the leading end of the bill; and a puller link having an eye loop passing through said openings and encompassing the bill material between said openings.

4. In an artificial fishing lure, the combination of an elongated buoyant plug tapered towards its opposite ends; hook means attached to said plug; a flat bill extending from an end of the plug in a horizontal plane containing the longitudinal center line of the plug; two spaced openings in said bill, both on the longitudinal center line of said bill and both being located a substantial distance to the rear of the leading end of the bill, the area of said bill exposed to the water in front of the intersection of the line of pull with the bill being greater than the area of the bill exposed to the water to the rear thereof; and a puller loop passing through said openings and encompassing the bill material between said openings.

5. In an artificial fishing lure, the combination of an elongated buoyant plug tapered towards its opposite ends; hook means attached to said plug; a flat bill extending from an end of the plug in a horizontal plane containing the longitudinal center line of the plug; and means on said bill for connection to a fishing line on the longitudinal center line of said bill and at a substantial distance to the rear of the leading end of the bill, the area of said bill exposed to the water in front of the intersection of the line of pull with the bill being greater than the area of the bill exposed to the water to the rear thereof; the buoyancy of said plug, the area of said bill, and the location of the connection between said fishing line connecting means being so related as to cause said lure to dive when pulled though the water.

6. In an artificial fishing lure, the combination of an elongated buoyant plug tapered towards its opposite ends; hook means attached to said plug; a flat bill extending from an end of the plug in a horizontal plane containing the longitudinal center line of the plug; two spaced openings in said bill, both on the longitudinal center line of said bill, and both being located closer to the plug than to the leading end of the bill; and a puller link having an eye loop passing through said openings and encompassing the bill material between said openings, said puller link being bendable transversely of a vertical plane containing the center line of said plug and bill and having such characteristics that when so bent it will remain in the bent condition while in use to give the lure a tendency to run to one side.

ISAAC J. WALKER.
RALPH E. WHAM.
CLARENCE S. TURBEVILLE.

REFERENCES CITED

The following references are of record in the file of this patent:

UNITED STATES PATENTS

| Number | Name | Date |
| --- | --- | --- |
| 1,202,631 | Winnie | Oct. 24, 1916 |
| 903,333 | Slocum et al. | Nov. 10, 1908 |
| 1,133,669 | Reynolds | Mar. 30, 1915 |
| 1,333,154 | Buddle | Mar. 9, 1920 |
| 799,491 | Palmer | Sept. 12, 1905 |
| 279,206 | Altena | June 12, 1883 |